United States Patent [19]

Fillingham et al.

[11] Patent Number: 4,923,148

[45] Date of Patent: May 8, 1990

[54] APPARATUS FOR STOWING AND DEPLOYING STORES FROM AIR AND MARINE CRAFT

[75] Inventors: John F. Fillingham, Clacton-on-Sea; Ronald J. Hawkins, Storrington; Anthony D. Wilson, Dartford, all of England

[73] Assignee: Babcock Energy Limited, London, England

[21] Appl. No.: 250,693

[22] PCT Filed: Jan. 26, 1988

[86] PCT No.: PCT/GB88/00047

§ 371 Date: Oct. 19, 1988

§ 102(e) Date: Oct. 19, 1988

[87] PCT Pub. No.: WO88/05398

PCT Pub. Date: Jul. 28, 1988

[30] Foreign Application Priority Data

Jan. 26, 1987 [GB] United Kingdom ............... 8701600
Aug. 3, 1987 [GB] United Kingdom ............... 8718359
Aug. 17, 1987 [GB] United Kingdom ............... 8719442
Aug. 17, 1987 [GB] United Kingdom ............... 8719443
Aug. 18, 1987 [GB] United Kingdom ............... 8719476

[51] Int. Cl.⁵ ............................................. B64D 9/00
[52] U.S. Cl. ................................. 244/137.1; 414/446; 89/1.51; 89/1.55; 89/1.59; 244/137.4
[58] Field of Search ............... 244/118.1, 137.1, 137.4, 244/137.3; 414/446, 276; 89/1.51, 1.55, 1.59

[56] References Cited

U.S. PATENT DOCUMENTS

| | | | |
|---|---|---|---|
| 2,329,383 | 6/1945 | Steel | 89/1.59 |
| 2,937,573 | 5/1960 | Gantschnigg | 89/1.5 |
| 2,977,853 | 4/1961 | Gehrkens et al. | 244/137.1 |
| 3,056,335 | 10/1962 | Thieblot et al. | 89/1.5 |
| 3,357,372 | 12/1967 | Bader | 244/137.3 |
| 4,131,251 | 12/1978 | Lloyd et al. | 244/137.3 |
| 4,161,301 | 7/1979 | Beardsley et al. | 244/137.3 |
| 4,256,012 | 3/1981 | Cowart et al. | 89/1.816 |
| 4,715,765 | 12/1987 | Agnoff | 414/276 |
| 4,759,676 | 7/1988 | Hammond | 414/276 |

FOREIGN PATENT DOCUMENTS

1074825 5/1967 United Kingdom .
1084497 9/1967 United Kingdom ............ 244/137.3

Primary Examiner—Galen Barefoot
Attorney, Agent, or Firm—Shlesinger & Myers

[57] ABSTRACT

Apparatus for stowing and deploying stores from air and marine craft (FIG. 2) in which the stores 28 are stowed on a modular stowage structure, such as pallets 32, with releasable locking devices 10 securing the pallets to the craft. Further releasable locking devices 29 and restraining means 30 are arranged to secure the stores to cradles 14 on respective associated pallets. The pallets and cradles are adapted to permit, upon release of the respective further releasable locking devices 29, movement by the effect of gravity of the stores to effect deployment of the stores. The stowage structure may be mounted on a ramp on the deck of the craft or the pitch of the vessel may be adjusted to effect deployment. The structure may be releasably slung beneath a sub-surface craft and provided with a fiberglass casing to make it floatable.

7 Claims, 5 Drawing Sheets

APPARATUS FOR STOWING AND DEPLOYING STORES FROM AIR AND MARINE CRAFT

DESCRIPTION

This invention relates to apparatus for stowing and deploying stores from air and marine craft.

In U.S. Pat. No. 4 161 301 there is disclosed apparatus for stowing and deploying stores from aircraft and surface marine craft including modular palletised stowage of such stores. The stores are stowed on cradles mounted in pallets and releasable locking devices secure the pallets together and to the craft. Rack and pinion drive mechanisms are provided to effect movement of the cradles relative to the pallets to a deployment position and to effect deployment. The rack and pinion drive mechanisms also serve to restrain movement of the cradles relative to the pallets by constituting an irreversible drive between the racks, the pinions and the drive motors.

According to one aspect of the present invention there is provided apparatus for stowing and deploying stores from air and marine craft including a modular stowage structure for such stores, the stores being stowed on the structure, with releasable locking devices securing the structure to the craft, in which further releasable locking devices are arranged to secure the stores to respective associated portions of the structure and are adapted to permit, upon release of the respective further releasable locking devices, movement of the stores to effect deployment of the stores.

According to another aspect of the present invention there is provided apparatus for stowing and deploying stores from air and marine craft including modular palletised stowage of such stores, the stores being stowed on pallets, with releasable locking devices securing the pallets to the craft, in which further releasable locking devices are arranged to secure the stores to respective associated pallets and the pallets are adapted to permit, upon release of the respective further releasable locking devices, movement by the effect of gravity of the stores to effect deployment of the stores.

According to yet another aspect of the present invention there is provided apparatus for stowing and deploying stores from air and marine craft including modular palletised stowage of such stores, the stores being stowed on cradles mounted in pallets, with releasable locking devices securing the pallets together and to the craft, in which further releasable locking devices are arranged to secure the cradles to respective associated pallets and the cradles and pallets are adapted to permit, upon release of the respective further releasable locking devices, movement by the effect of gravity of the cradles relative to the pallets to a deployment position and, also by the effect of gravity, to effect deployment of the cradles.

According to a further aspect of the present invention there is provided apparatus for stowing and deploying stores from sub-surface marine craft including a stowage structure releasably locatable on the sub-surface marine craft and provided with a hanger support having releasable hanger means for individual pendant support of respective stores.

According to a yet further aspect of the present invention there is provided apparatus for stowing and deploying stores from sub-surface marine craft including a stowage structure releasably attachable to the underside of the sub-surface craft at five attachment locations, two of the attachment locations being laterally spaced apart at the forward end of the structure, two of the attachment locations being laterally spaced apart at the aft end of the structure and the fifth location being adjacent the center of the structure, attachment means at the fifth location being engageable between the stowage structure and the sub-surface marine craft prior to engagement of attachment means at the fore and aft locations between the structure and the craft and dis-engageable subsequent to disengagement of the attachment means at the fore and aft locations.

According to another further aspect of the present invention there is provided apparatus for stowing and deploying stores from sub-surface marine craft including a stowage structure releasably attachable to the underside of the sub-surface craft at attachment locations comprising aft facing L-shaped brackets secured to sub-surface craft in laterally spaced apart pairs at longitudinal intervals from the forward end of the support structure, with link lugs provided on the stowage structure arranged to engage upon the L-shaped brackets and a retaining pin movable between a position engaging the stowage structure to restrain aftward movement of the stowage structure relative to the sub-surface craft and a disengaged position at which aftward movement of the stowage structure is permitted.

According to yet another further aspect of the present invention there is provided apparatus for stowing and deploying stores from aircraft and surface marine craft including modular palletised stowage of such stores, the stores being stowed on cradles mounted in pallets and releasable locking devices secure the pallets together and to the craft in which further releasable locking devices are arranged to secure the cradles to respective associated pallets and the cradles and pallets are adapted to permit, upon release of the respective further releasable locking devices, movement as a longitudinally connected string of the cradles by the action of a reciprocable pulling device connectable repetitively to a respective endmost cradle to move the endmost cradle from the endmost pallet to a transfer station, means to effect transfer of the endmost endmost cradle from the transfer station to the deployment position and means to effect the deployment of the cradles from the deployment position.

The invention will now be described, by way of example, with reference to the accompanying, partly diagrammatic, drawings, in which:

FIG. 7 is a side elevation of further alternative arrangement suitable for utilization in conjunction with a sub-surface marine craft; and FIG. 8 is a cross-sectional end elevation of the arrangement of FIG. 7, indicating in chain dotted outline a portion of the hull of the craft.

Figure 1:
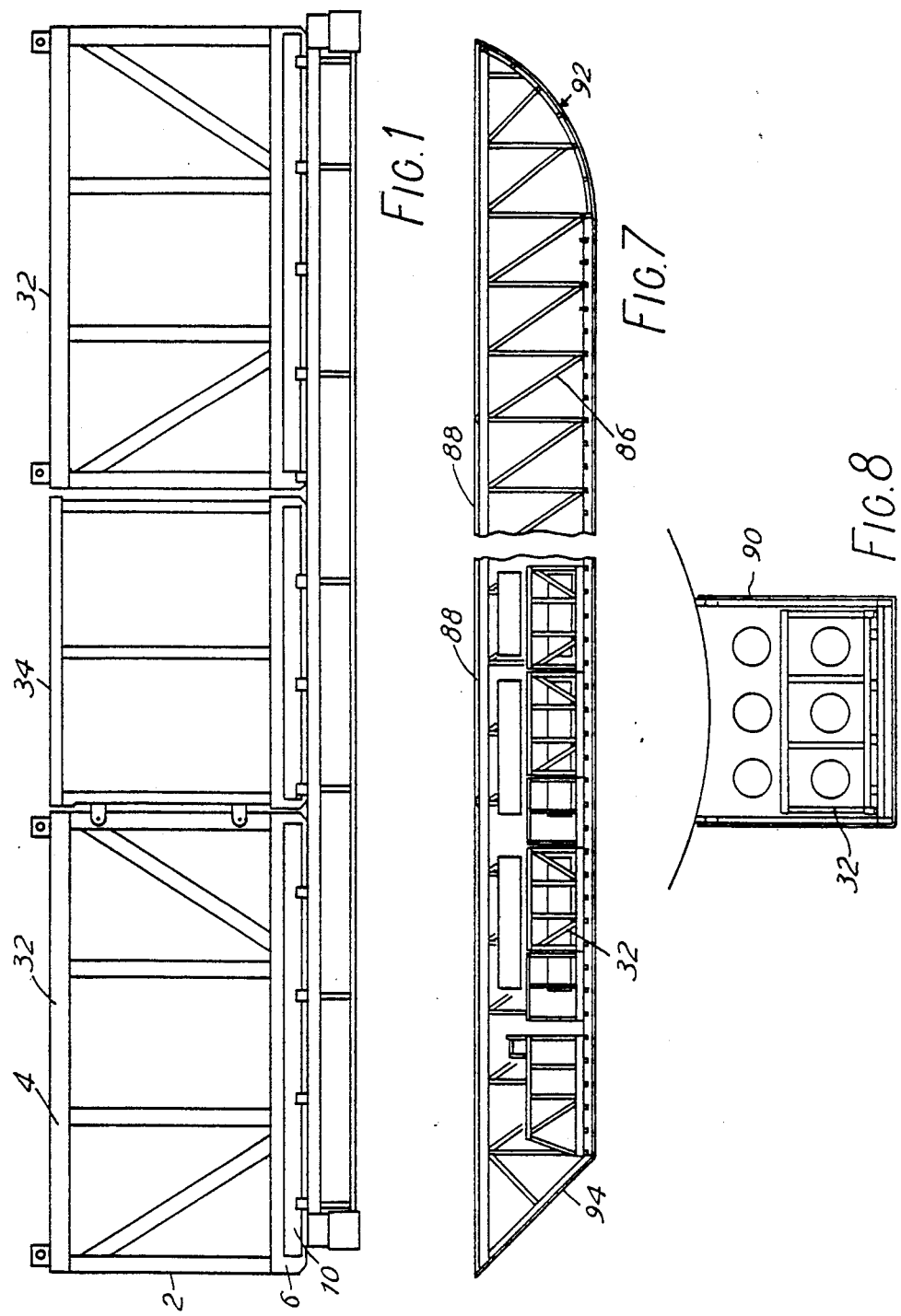
FIG. 1 is a side elevation of two standardized pallets having, intermediate therebetween, an extension pallet.
Figure 2:
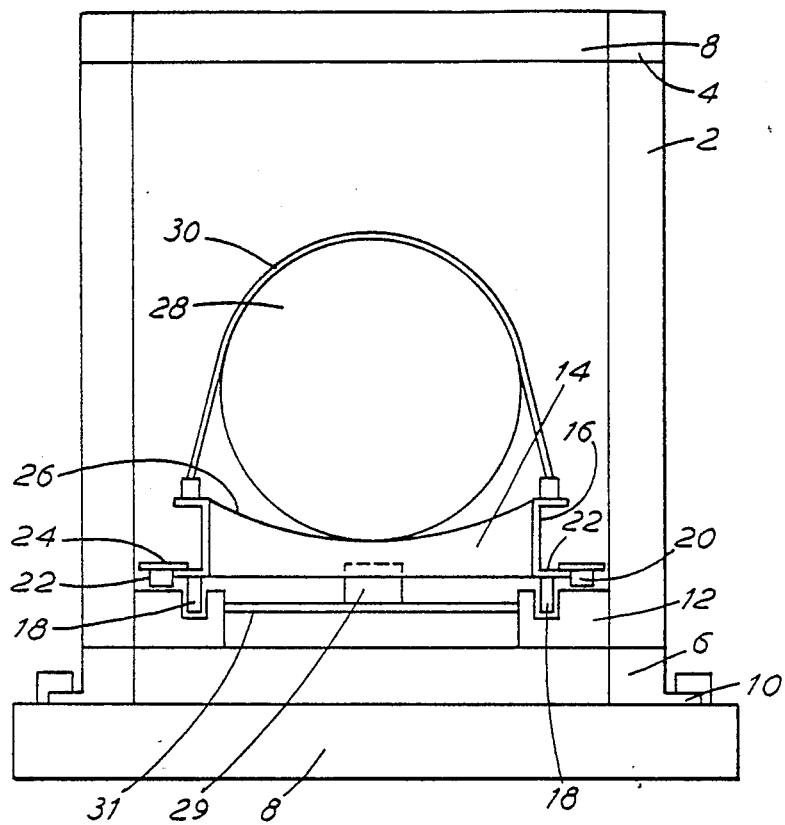
FIG. 2 is an end elevation of a pallet with a cradle in position.

As shown in FIGS. 1 and 2, each pallet has a framework including upright stanchions 2 connecting upper and lower longitudinal stringers 4,6 and lateral cross beams 8 braced to form a rigid structure of standardized dimensions. The lower longitudinal stringers 6 are formed with anchorages 10 for engagement with the craft, or, where the pallets are stacked, a subjacent pallet. The base of the pallet carries a longitudinal track 12 for an associated cradle 14 having laterally spaced longitudinal skids 16 and includes spaced pairs of rollers 18 on horizontal axes arranged respectively to engage the underside of the skids and spaced pairs of rollers 20 on vertical axes arranged respectively to engage outer flanged faces 22 of the skids, such that the cradle may roll freely on the rollers upon releasing a detent provided to secure the cradle in register with the pallet. Flanges 24 on the vertically axled rollers 20 extend inwardly superjacent the outer flanged faces of the skids to restrain upward movement of the cradle.

Each cradle 14 is formed with support surfaces 26 for an associated store 28 and releasable restraining means 30 for securing the store to the cradle. A detent 29 mounted on a shaft 31 located on the tracks 12 is rotatable from the position shown engaging, and restraining, the cradle 14 to a dis-engaged position in which the cradle is free to move along the tracks.

Since the pallets are of standardized dimensions, they are alignable longitudinally such that the cradles are movable from the rollers 18, 20 of one pallet on to the rollers the adjacent pallet, the skids 16 sequentially engaging the respective rollers.

Where stores of greater length than a standardized pallet 32 are to be accommodated an auxiliary extension pallet 34 is connected at one end of the standardized pallet.

At the deployment position a deployment section (not shown) having a framework similar in form to that of the standardized pallet 32 is provided registering with and connected to the endmost pallet. The deployment section includes sets of vertically and horizontally axled rollers (with flanges 24 omitted) together with actuating means to effect, where required, release of the restraining means securing the stores to the cradle and actuating respective devices associated with the stores during passage of respective stores through the deployment section.

Movement of the stores, upon disengagement of the associated detent 29, is initiated by gravity, with the pitch of the craft (particularly an aircraft) being adjusted to an inclination sufficient for the gravitational forces to overcome inertia and friction.

Figure 3:
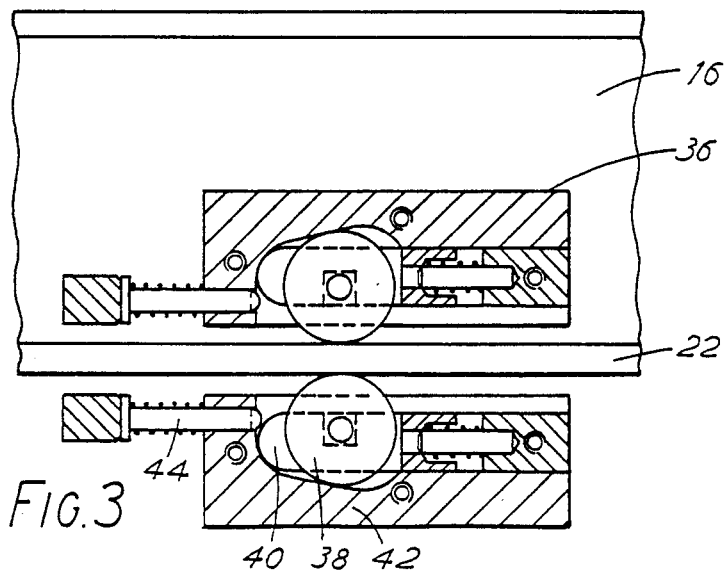
FIG. 3 is a cross-sectional side elevation of a means for restraining movement of the cradles relative to the pallets.

As shown in FIG. 3 means 36 for restraining movement of the cradles in a forward direction, that is, in a direction opposed to the direction of deployment, each include a pair of rollers 38 mounted on saddles 40 in a block 42. The blocks 42 are secured to respective pallets and the rollers 38 bear against the outer flanged faces 22 of the cradle skids 16. The blocks 42 are formed with tapered housings for the rollers 38 and the saddles 40 are spring biassed such that, upon initial movement of the skids in a forward direction, the rollers jamb in the housing to prevent further forward movement. Movement of the skids in a rearward direction releases the rollers from the jambed position. It will be appreciated that the skids may readily enter the means 36 upon transferring cradles rearwardly towards a deployment position. To facilitate loading of cradles forwardly into the pallets, over-ride means 44 are provided to urge the rollers 40 apart.

Figure 4:
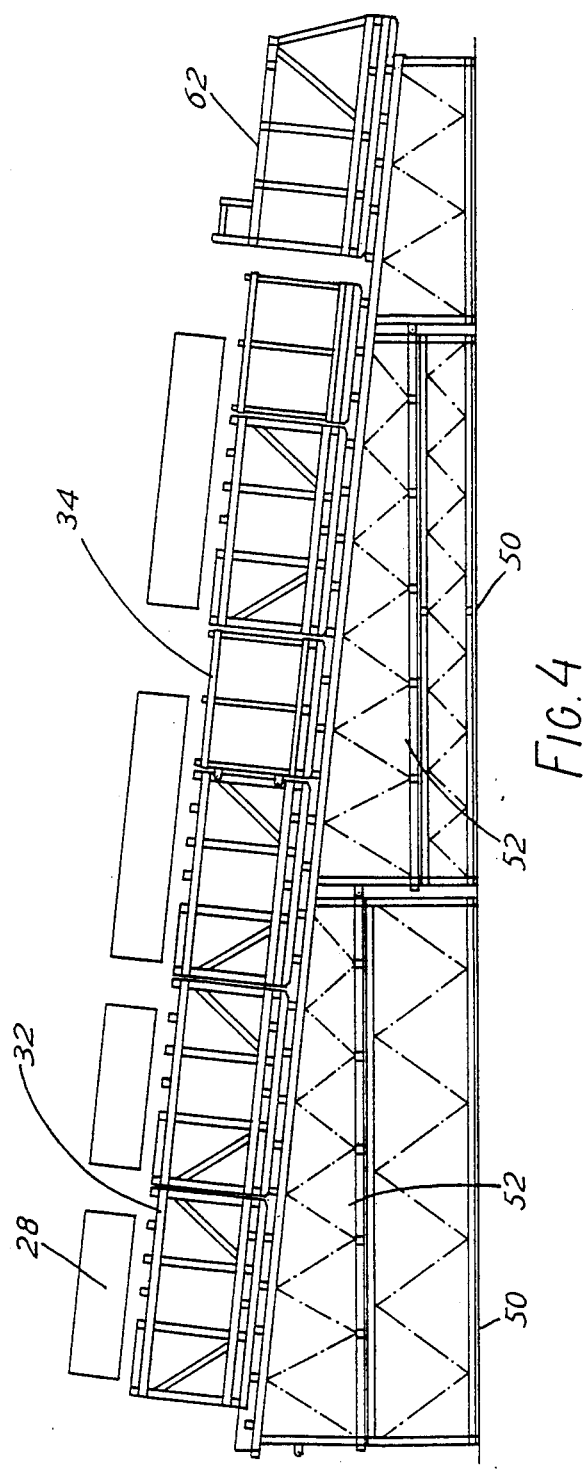
FIG. 4 is a side elevation of a wedge shaped structure carrying a series of pallets.

As shown in FIG. 4, where it is not possible to vary the pitch of the craft to a sufficient inclination, such as with a surface marine craft, the pallets may be positioned on a wedge-shaped structure providing a suitable inclination. The wedge shaped structure is formed with framework structures of modular form having dimensions similar to that of the pallets and are provided with anchorages compatible with those of the pallets. Base modules 50 of parallelepiped form have form and dimensions corresponding to those of the pallets, whilst wedge modules 52 have a truncated wedge form with one end face having a greater vertical dimension than the other end face and the base face corresponding to that of the base module.

Braking means are provided to retard movement of cradles within the pallets where it is required to release the cradles individually in sequence.

Figure 5:
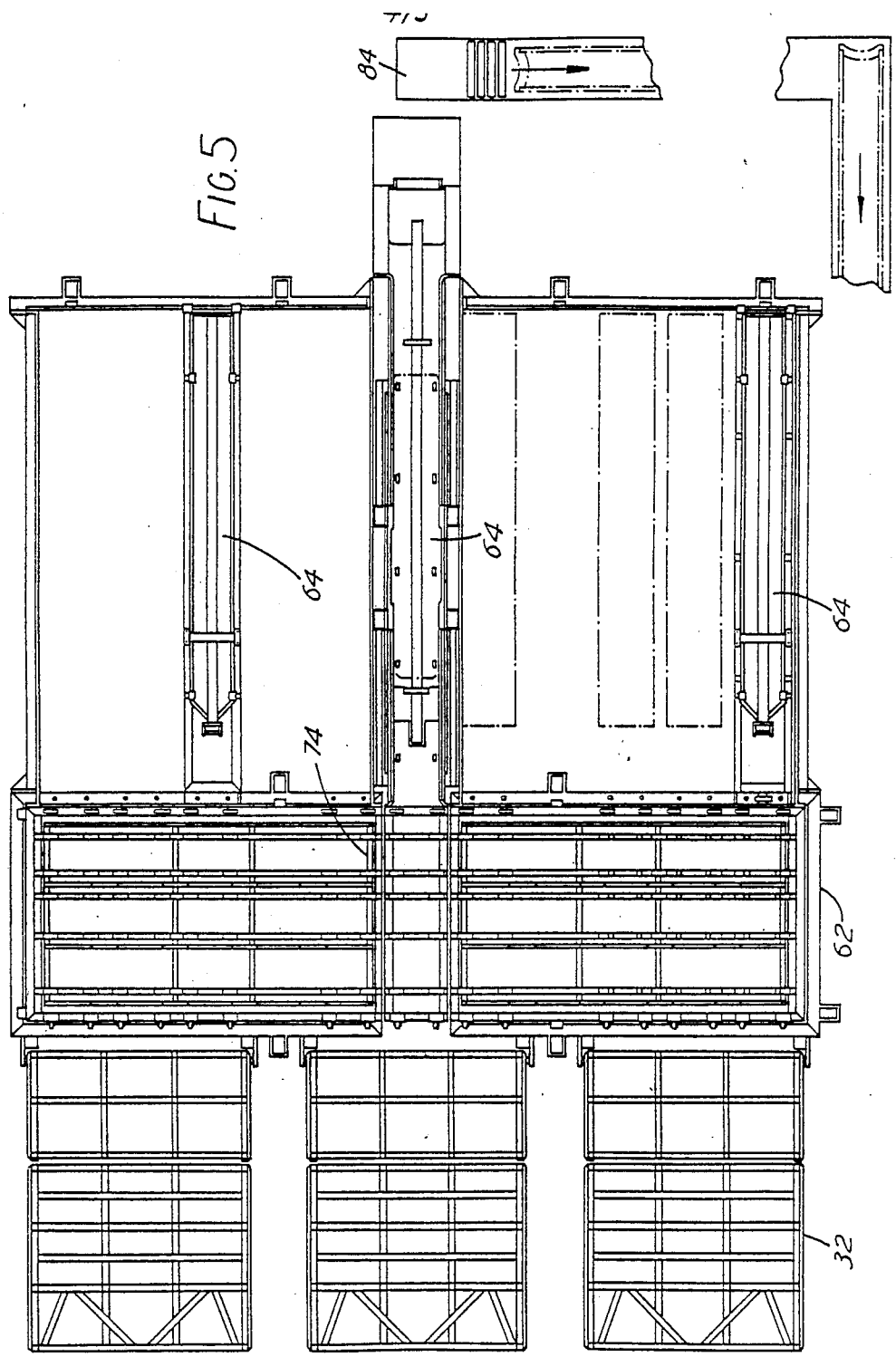
FIG. 5 is a plan view of a portion of an alternative installation of pallets and associated structures suitable for a surface marine craft of the roll-on-roll-off type having a stern door.
Figure 6:
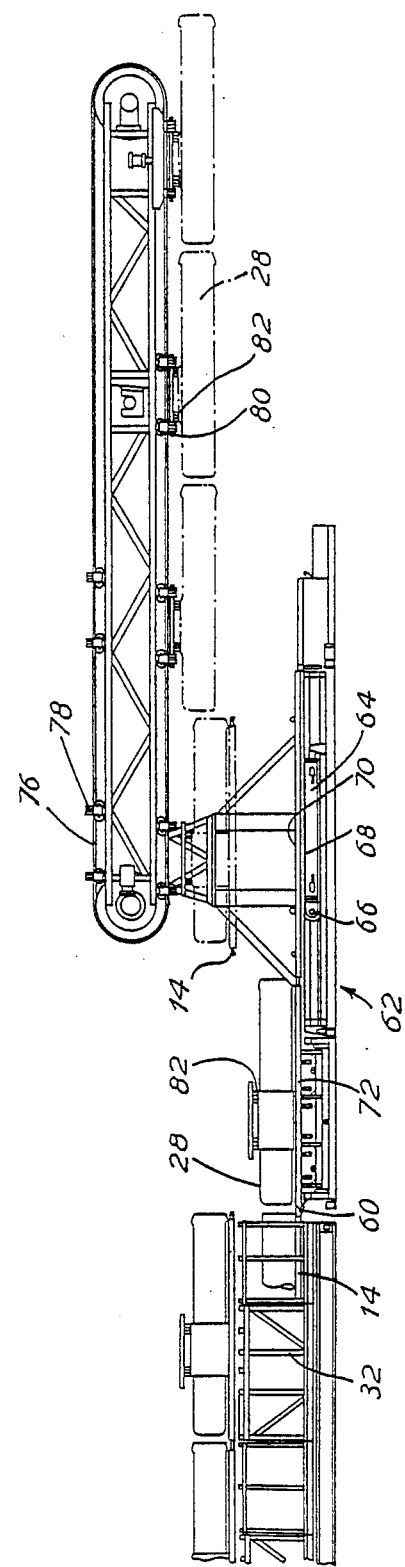
FIG. 6 is a side elevation of the installation shown in FIG. 5.

In the alternative embodiment, shown in FIGS. 5 and 6, which is particularly suited for installation in a marine craft of the roll-on-roll-off type having a stern door, a multiplicity of pallets are juxtaposed in longitudinal alignment in banks extending laterally and vertically, portions of only the lower banks being shown. The cradle 14 in longitudinally aligned pallets 32 are coupled together in strings with pin and socket devices 60 at forward and rearward ends of the cradles, such that movement of the string is effected by pulling the endmost cradle 14.

A framework forming a transfer station 62 is secured to the endmost pallets and carries a repetitively reciprocable hydraulic ram 64 connected to a pinion 66 of a fixed and free double rack and pinion drive 68 exhibiting a 2:1 linear movement enhancement. The free rack 70 has a head engageable with the socket device 60 on the endmost cradle of the string when the free rack is in a fully extended position. Upon retracting the ram 44 and the free rack 70 to a fully retracted position the string of cradles is pulled rearwardly to move the endmost cradle of the endmost pallet to the transfer station 62.

Lateral transfer means 72 at the transfer station are arranged to raise the endmost cradle 14 slightly, to effect disengagement of the pin and socket coupling device 60 with the adjoining cradle and the coupling with the head on the free rack, and to move the cradle laterally to a deployment position 74.

The deployment position 74 includes an overhead endless chain conveyor 76 extending through and supported on a stern door frame (not shown) and having overhead carriages 78 provided with arms 80 for releasable engagement with transfer lugs 82 on the stores 28. Actuating means (not shown) are provided to effect disengagement of the restraining means securing the store to the associated cradle simultaneously with engagement of the arms with the transfer lugs. The endless chain conveyor serves to carry the store rearwardly and deployment is effected aft of the craft by trip releasing the arms 80 from the lugs 82.

The transfer station 62 is carried on a structure enabling the free rack 70 to be indexed in sequence into alignment with each of the strings of cradles in the associated bank of pallets to effect pulling of the respective strings of cradles one by one from the associated pallets.

Actuation of respective devices associated with the stores is effected either during lateral transfer to the deployment position or at the deployment position.

Following disengagement from the store, the cradle is moved to a further roller track 84 for return to the forward ends of the pallets, there to be re-inserted into the pallet for subsequent re-use.

Referring to the further alternative arrangement shown in FIGS. 7 and 8 a braced lattice stowage structure 86 of parallelipiped form is provided with attachment lugs 88 extending from upper portions thereof for engagement with attachment means (not shown) on the underside of the sub-surface craft. An outer casing skin 90, such as of fiberglass, is provided around the lateral faces of the stowage structure remote from the sub-surface craft and fairings 92, 94 are provided fore and aft such that a boat-like structure is formed. Anchorage locations are provided at intervals on the interior of the stowage structure to enable a multiplicity of pallets 32 to be stowed in the stowage structure.

Movement of the stores, upon disengagement of the associated detent, is initiated by gravity, with the pitch of the craft being adjusted to an inclination sufficient for the gravitational forces to overcome inertia and friction.

In operation, the stowage structure 86 is loaded with pallets 32, cradles 14 and stores 28 either on land or floating alongside a jetty. The loaded structure 86 is then transported or towed to a dock and, if necessary, sunk. The stowage structure is then appropriately located on the floor of the dock and the sub-surface craft floated in above the stowage structure. The level of water in the dock is then lowered such that the craft settles on to support stocks on the base of the dock with the attachment lugs 88 on the stowage structure in alignment with the attachment means on the underside of the sub-surface craft, jacking means being used to provide small adjustments to the position of the stowage structure if necessary. Engagement of the attachment lugs with the attachment means is then effected and the level of water in the dock again raised to enable the craft to be floated out of the dock.

To effect deployment of the stores, the aft fairing 94 is jettisoned, the horizontal fore and aft pitch varied to an inclination at which movement by the effect of gravity, and also possibly the effect of drag, of the cradles 14 towards the deloyment position, upon release of the further locking devices, occurs. The cradles are released in sequence until all of the stores 28 have been deployed, whereupon, if desired, the stowage structure 86 may be jettisoned by disengaging the attachment lugs 88 on the stowage structure from the attachment means on the sub-surface craft.

In an alternative form (not shown) of the arrangement of FIGS. 7 and 8, secured to the upper stringers and cross beams of the pallets is a hanger support provided with releasable hanger means for individual pendant support of respective stores. The portions of outer casing skin immediately subjacent each releasable hanger means are of frangible form. Alternatively, such portions may be formed as knock-out panels which, furthermore, respectively many be attached to individual stores. The releasable hanger means are provided with remotely and individually actuable detents engaging retaining lugs on the stores.

To effect deployment of the respective stores, the associated detent is actuated from a remote location to release the store from the hanger means. The store falls, by the effect of gravity, and passes through the immediately subjacent portion of the outer casing skin, either rupturing the skin or effecting removal of the associated panel. The stores are released in sequence until all of the stores have been deployed, whereupon, if desired, the stowage structure may be jettisoned by disengaging the attachment lugs on the stowage structure from the attachment means on the sub-surface craft.

In a further alternative form (not shown) of the arrangement of FIGS. 7 and 8, the hanger supports are provided on the braced lattice stowage structure, dispensing with the pallets. The stores are loaded directly on to the stowage structure, to hang from releasable hanger means provided with remotely and individually actuable detents retaining lugs on the stores. Deployment of the respective stores and, if desired, subsequent jettisoning of the stowage structure is effected as described above.

In an alternative form of the attachment (not shown) the stowage structure is releasably attachable to the underside of the sub-surface craft at five attachment locations. Five, screw threaded, pintles are positioned with two laterally spaced apart at the forward end, two laterally spaced apart at the aft end and a fifth, which is of greater length than the others, adjacent the center of the stowage structure. Five rotatable nut means are positioned in housings on the sub-surface craft to mate with the pintles on the stowage structure. Drive means to effect rotation of the nuts may be operable individually, in approximate unison, or may be mechanically interconnected to operate in unison.

In operation, the stowage structure is loaded with stores and located on the floor of the dock and the sub-surface craft floated in above the stowage structure as previously described. The level of water in the dock is then lowered such that the craft settles on to support stocks on the base of the dock with the screw threaded pintles on the stowage structure in registration with the rotatable nuts in the housings on the underside of the sub-surface craft, jacking means being used to provide small adjustments to the position of the stowage structure if necessary. Engagement of the pintles with the nuts is then effected, with the central, fifth, pintle engaging initially, and following rotation of the nuts, the remaining pintles engaging to draw the structure up to the craft. The level of water in the dock is then again raised to enable the craft to be floated out of the dock.

The stowage structure is jettisonable from the sub-surface craft, by rotating the five rotatable nuts in unison, or approximate unison. Since the central fifth, pintle is longer than the others, the other pintles dis-engage from the respective nuts prior to the central pintle and nut dis-engaging, thereby avoiding the danger of an asymmetric dis-engagement.

In a yet further alternative form (not shown) of attachment, the stowage structure is releasably attachable to the underside of the sub-surface craft by means of link lugs provided on the structure arranged to engage with aft facing, L-shaped, brackets provided on the underside of the craft together with a releasable retaining pin arranged, in the retaining position, to restrict aftwards movement of the structure in relation to the craft. The brackets are positioned in laterally spaced apart pairs at longitudinal intervals from the forward end of the stowage structure, the longitudinal intervals being determined from consideration of the loadings upon the brackets. The retaining pin is positioned on the underside of the craft and is movable between a position engaging the stowage structure and a dis-engaged position permitting aftward movement of the stowage structure. Axial movement of the pin between the engaged and dis-engaged positions, in one arrangement, is effected by forming the pin with a spline or keyway and a screw thread to co-act with a rotatable nut positioned upon the craft such that rotation of the nut effects raising or lowering of the pin.

In operation, the stowage structure is loaded with stores and located on the floor of the dock and the sub-surface craft floated in above the stowage structure as previously described. The level of water in the dock is then lowered such that the craft settles on to support stocks on the base of the dock with the link lugs on the stowage structure in registration with the L-shaped brackets on the underside of the sub-surface craft, jacking means being used to provide small adjustments to the position of the stowage structure if necessary. Engagement of the link lugs with the brackets is then effected utilizing the jacking means to move the structure forwardly relative to the craft. The retaining pin is then moved to the engaged position to restrain aftward movement of the structure, thereby ensuring that the link lugs remain in engagement with the brackets and the weight of the structure is transferred through the link lugs to the brackets and the craft. The level of water in the dock is then again raised to enable the craft to be floated out of the dock.

The stowage structure is jettisonable from the sub-surface craft by moving the retaining pin to the dis-engaged position in which aftward movement of the structure is no longer restrained. With the sub-surface craft in motion, the drag effect on the stowage structure is sufficient to effect aftward movement of the structure, thereby dis-engaging the link lugs from the brackets and allowing the structure to fall away from the craft.

I claim:

1. Apparatus for stowing and deploying stores relative to air and marine craft including a modular stowage structure for such stores, pallets releasably mounted on the modular stowage structure, releasable locking devices arranged to secure the pallets to the modular stowage structure, the pallets being formed with base portions respectively providing alignable longitudinal tracks, the tracks being formed by spaced pairs of rollers on substantially horizontal axes and spaced pairs of rollers on substantially vertical axes, cradles formed with laterally spaced, longitudinally extending, skids arranged to co-act with the respective pairs of rollers to roll freely in relation to the rollers, further releasable locking devices arranged to secure respective cradles to associated pallets the cradles being formed with support surfaces respectively adapted to accommodate any one of a series of stores, each one of the series of stores having dimensions differing from the dimension of the remainder of the series, the cradles and the pallets being adapted to permit—upon release of the respective further releasable locking devices—movement by the effect of gravity of the cradles relative to the pallets to a deployment position and, also by the effect of gravity, to effect deployment of the cradles.

2. Apparatus for stowing and deploying stores relative to air and sub-surface marine craft as claimed in claim 1, in which the modular stowage structure includes a framework having the pallets releasably locked thereto aligned with the longitudinal axis of the air or sub-surface marine craft, the deployment position being at the rear of the air or sub-surface marine craft and the pitch of the said craft being variable to an inclination at which movement occurs by the effect of gravity of the cradles towards the deployment position.

3. Apparatus as claimed in claim 1, wherein a modular structure provided at the deployment position has means readily permitting releasable attachment to the craft and the adjoining rearmost pallet and means for effecting actuation of respective devices associated with the stores.

4. Apparatus as claimed in claim 3, wherein the modular structure includes means for releasing stores from the respective associated cradle.

5. Apparatus as claimed in claim 1, wherein the further releasable locking devices arranged to secure respective cradles to associated pallets include means adapted to restrain movement of the stores in a direction away from the deployment position and to facilitate movement toward the deployment position upon release of a separate latch mechanism, each of the means comprising a pair of rollers mounted on saddles in a block secured to a respective pallet with the pair of rollers co-acting with tapered housings in the block and bearing respectively against opposed faces of an outwardly directed flange on the cradle, the associated saddles being spring biassed to urge the rollers along the tapered housings in a direction in which the rollers are urged to converge together thereby jambing the outwardly directed flange therebetween to restrain movement of the flange and associated cradle in a direction away from the deployment position, and over-ride means provided arranged to be contactable with the spring biassed saddles to urge the saddles along the tapered housing in a direction in which the rollers diverge from each other thereby permitting movement of the outwardly directed flange therebetween in a direction away from the deployment position.

6. Apparatus for stowing and deploying stores relative to air and marine craft including a modular stowage structure for such stores, the modular storage structure being releasably secured to the craft, pallets releasably mounted on the modular stowage structure, releasable locking devices arranged to secure the pallets to the modular stowage structure, the pallets being formed with base portions respectively providing alignable longitudinal tracks, the tracks being formed by spaced pairs of rollers on substantially horizontal axes and spaced pairs of rollers on substantially vertical axes, cradles formed with laterally spaced, longitudinally extending, skids arranged to co-act with the respective pairs of rollers to roll freely in relation to the rollers, further releasable locking devices arranged to secure respective cradles to associated pallets the cradles being formed with support surfaces respectively adapted to accommodate any one of a series of stores, each one of the series of stores having dimensions differing from the dimension of the remainder of the series, the cradles and the pallets being adapted to permit—upon release of the respective further releasable locking devices—movement by the effect of gravity of the cradles relative to the pallets to a deployment position and, also by the effect of gravity, to effect deployment of the cradles.

7. Apparatus for stowing and deploying stores relative to surface marine craft as claimed in claim 6, in which the modular stowage structure includes a ramp structure having the pallets releasably locked to a ramp with an inclination sufficient to provide gravitational impetus to the cradles, upon release of the further releasable locking devices, to effect movement and deployment of the cradles.

* * * * *